US012312841B2

(12) United States Patent
Bajul et al.

(10) Patent No.: US 12,312,841 B2
(45) Date of Patent: May 27, 2025

(54) EMERGENCY ACCESS DEVICE FOR A VEHICLE OPENABLE LEAF

(71) Applicant: VITESCO TECHNOLOGIES GMBH, Regensburg (DE)

(72) Inventors: Xavier Bajul, Toulouse (FR); Nicolas Lefrancq, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 220 days.

(21) Appl. No.: 17/777,495

(22) PCT Filed: Jan. 7, 2021

(86) PCT No.: PCT/EP2021/050188
§ 371 (c)(1),
(2) Date: May 17, 2022

(87) PCT Pub. No.: WO2021/144190
PCT Pub. Date: Jul. 22, 2021

(65) Prior Publication Data

US 2023/0358081 A1 Nov. 9, 2023

(30) Foreign Application Priority Data

Jan. 16, 2020 (FR) ....................................... 2000392

(51) Int. Cl.
*E05B 81/76* (2014.01)
*E05B 77/12* (2014.01)
(Continued)

(52) U.S. Cl.
CPC .............. *E05B 81/90* (2013.01); *E05B 77/12* (2013.01); *E05B 79/20* (2013.01); *E05B 81/08* (2013.01);
(Continued)

(58) Field of Classification Search
CPC .......... E05B 79/20; E05B 81/08; E05B 81/78; E05B 2015/041; E05B 2015/0486; E05B 2015/0496; E05B 85/107; E05B 15/0093
See application file for complete search history.

(56) References Cited

U.S. PATENT DOCUMENTS 10,767,402 B2 9/2020 Hoffmann et al.
2005/0034493 A1 2/2005 Wittwer et al.
(Continued)

FOREIGN PATENT DOCUMENTS

CN 102022047 A 4/2011
CN 107787389 A 3/2018
(Continued)

OTHER PUBLICATIONS

Office Action issued in Chinese Patent Application No. 202180009349.X dated Feb. 9, 2023.
(Continued)

*Primary Examiner* — Michael P Ferguson
*Assistant Examiner* — Thomas L Neubauer
(74) *Attorney, Agent, or Firm* — NIXON & VANDERHYE

(57) ABSTRACT

Emergency access device for a vehicle opening leaf, including: —a graspable pull rod that is movable between a retracted position and a deployed position; —a retention needle that is movable transversely to the pull rod between a position for blocking the pull rod in its retracted position and a position for releasing the pull rod; —an electric ejector designed to release the pull rod; —a mechanical ejector designed to release the pull rod; the pull rod including an oblique path designed to cause the retention needle to move from its blocking position to its releasing position during a movement of the pull rod in translation.

20 Claims, 6 Drawing Sheets

(51) Int. Cl.

| | |
|---|---|
| ***E05B 79/20*** | (2014.01) |
| ***E05B 81/08*** | (2014.01) |
| ***E05B 81/78*** | (2014.01) |
| ***E05B 81/90*** | (2014.01) |
| ***E05B 85/12*** | (2014.01) |
| *E05B 15/04* | (2006.01) |

(52) U.S. Cl.

CPC ........ *E05B 81/78* (2013.01); *E05B 2015/041* (2013.01); *E05B 2015/0486* (2013.01); *E05B 2015/0496* (2013.01)

(56) References Cited

U.S. PATENT DOCUMENTS

| | | | | |
|---|---|---|---|---|
| 2016/0305164 | A1 | 10/2016 | Bendel | |
| 2019/0169889 | A1* | 6/2019 | Beck | E05B 77/02 |

FOREIGN PATENT DOCUMENTS

| | | | |
|---|---|---|---|
| CN | 110499970 | A | 11/2019 |
| FR | 2 971 536 | | 8/2012 |
| WO | 2015/062586 | | 5/2015 |
| WO | 2018/024405 | | 2/2018 |

OTHER PUBLICATIONS

International Search Report dated Apr. 15, 2021, for PCT/EP2020/050188 (5 pp., including English translation).

Written Opinion of the International Searching Authority dated Apr. 15, 2021, for PCT/EP2020/050188 (7 pp.).

* cited by examiner

EMERGENCY ACCESS DEVICE FOR A VEHICLE OPENABLE LEAF

This application is the U.S. national phase of International Application No. PCT/EP2021/050188 filed Jan. 7, 2021, which designated the U.S. and claims priority to FR 2000392 filed Jan. 16, 2020, the entire contents of each of which are hereby incorporated by reference.

BACKGROUND OF THE INVENTION

Field of the Invention

The invention relates to the automotive field and concerns an emergency access device associated with a vehicle opening leaf.

Description of the Related Art

In order to allow access to a motor vehicle, for example, opening leafs such as the doors are equipped with access devices. The most common access devices are handles that are mechanically connected to a lock such that actuation of the handle by the user actuates the lock and allows opening.

Furthermore, more advanced access devices currently exist in which no mechanical connection is required for normal operation of the access device. These devices generally comprise a sensor for sensing the presence of the user's hand. If the user is authorized to open the vehicle, for example if he or she is carrying a required fob, the vehicle then actuates an electric strike in the lock of the opening leaf and thus allows access to the vehicle.

These access devices allow a reduction in mass, bulk and cost and also greater ease of use since no physical connection with the lock is necessary in normal operation. However, for safety reasons in particular, these access devices nevertheless require an emergency access device providing a mechanical connection with the lock of the opening leaf in the event of an emergency or of an electrical failure.

Vehicles equipped with access devices having no mechanical connection between the handle of an opening leaf and its lock in normal operation are known. These known devices comprise an emergency access device comprising a mechanical and retractable means for actuating the lock.

SUMMARY OF THE INVENTION

The object of the invention is to improve the emergency access devices of the prior art so as to allow opening, in the event of an emergency, of an opening leaf equipped with an access device having no mechanical connection between the handle and the lock of the opening leaf.

To this end, the invention concerns an emergency access device for a vehicle opening leaf, comprising:

- a body;
- a graspable pull rod that is connected to a lock actuator and is movable between: a retracted position in which the pull rod is retracted into the body; and a deployed position in which the pull rod protrudes from the body;
- an elastic member that urges the pull rod toward its deployed position;
- a retention needle that is movable transversely to the pull rod between a position for blocking the pull rod in its retracted position and a position for releasing the pull rod;

- an electric ejector designed to release the pull rod from its retracted position, the electric ejector comprising an electric actuator designed to move the retention needle from its blocking position to its releasing position;
- a mechanical ejector designed to release the pull rod from its retracted position, the mechanical ejector comprising a slider that is movable between: a position for immobilizing the retention needle in its releasing position; and a position for releasing the retention needle;
- the pull rod comprising an oblique path designed to cause the retention needle to move from its blocking position to its releasing position during a movement of the pull rod in translation in the body.

The emergency access device according to the invention performs two separate functions, for example within a vehicle:

- in the event of the vehicle being in an accident, an opening leaf such as a door of the vehicle must be able to be opened from the outside by the emergency services. The doors have generally been unlocked during the accident. The vehicle also controls the electric ejector of the emergency access device such that the pull rod is released and occupies its deployed position. The opening leaf is thus ready to be opened manually from the outside by virtue of the mechanical connection provided by the pull rod that is ready to be grasped;
- in the event that the vehicle no longer has the necessary electrical energy (discharged battery, for example), the user can manually actuate the emergency access device such that the mechanical ejector releases the pull rod so that it occupies its deployed position and can be actuated by the user.

The emergency access device according to the invention performs these two functions with a small number of parts, thus ensuring reduced bulk and costs and also increased reliability.

Specifically, the electric ejector comprises a single main part such as an electric actuator (an electromagnet, for example), and the mechanical ejector also comprises only a single main part, which is a slider. These two ejectors cooperate with the same retention needle that is designed to block the pull rod in its retracted position or to release it.

The emergency access device according to the invention may comprise the following additional features, on their own or in combination:

- the pull rod comprises a hollow body and the lock actuator comprises a cable that is threaded into the hollow body; and the pull rod comprises a longitudinal slot, the pull rod being designed, in its deployed position, to pivot with respect to the cable so that the cable protrudes from the longitudinal slot;
- the body comprises a tongue designed to be inserted into the longitudinal slot when the pull rod is in its retracted position;
- the pull rod comprises a radial groove bounded by: an annular stopping surface designed to cooperate with a stopping finger situated at one end of the retention needle in order to keep the pull rod in its retracted position; and a conical surface forming said oblique path;
- the pull rod has a pressure end comprising a bevel that forms an oblique path designed to push the retention needle from its blocking position toward its releasing position when the pull rod is inserted into the body;
- the slider comprises a slot, and the elastic member comprises an ejection tab designed to apply a load to a pressure end of the pull rod, the ejection tab passing through the slot of the slider;

the slot of the slider comprises a lateral blocking surface, the ejection tab being designed to apply a load to the lateral blocking surface and to cause the slider to move in translation from its releasing position toward its immobilizing position, the device having an unlocking position in which the pull rod is driven to the maximum into the body, the pressure end of the pull rod urging the ejection tab against the lateral blocking surface of the slider and the slider being in its immobilizing position retaining the retention needle in its releasing position;

the slot of the slider comprises a lateral release surface, the ejection tab being designed to apply a load to the lateral release surface and to cause the slider to move in translation from its immobilizing position toward its releasing position, the device having a locking position in which the pull rod is in its deployed position, the ejection tab being urged against the lateral release surface of the slider and the slider being in its position for releasing the retention needle;

the ejection tab comprises a curved end forming a stop of the elastic element against the body when the device is in the locking position;

the retention needle comprises a stopping shoulder and the slider comprises a second slot having a blocking rim, the retention needle passing through the second slot and the stopping shoulder being in abutment against the blocking rim when the slider is in its immobilizing position.

BRIEF DESCRIPTION OF THE DRAWINGS

Other features and advantages of the invention will become apparent from the following non-limiting description, with reference to the appended drawings, in which.

DESCRIPTION OF THE PREFERRED EMBODIMENTS

Figure 1:
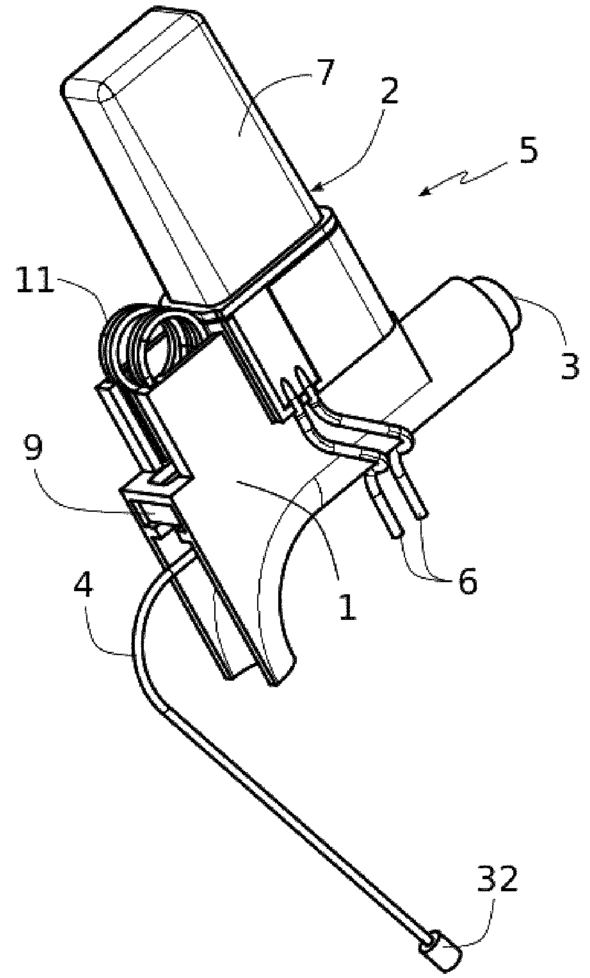
FIG. 1 shows a perspective view of an emergency access device according to the invention.

FIG. 1 shows an emergency access device 5 for a vehicle opening leaf, in perspective. This device 5 comprises a body 1 on which an electric actuator 2, supplied with power by conductors 6, is mounted. A button 3 is accessible on the body 1 and an opening cable 4 protrudes from the body 1.

The emergency access device 5 is, for example, intended to be housed in an emergency access box (not shown) of a motor vehicle opening leaf. This opening leaf is, for example, a door of the vehicle. This door of the vehicle is furthermore equipped with an access device which opens the lock electrically on the basis of the information from a sensor for sensing the presence of an identified user's hand. The emergency access device 5 housed in the emergency access box is not used in normal operation. This emergency access box is preferably arranged close to the handle.

The body 1 of the emergency access device 5 is preferably concealed in the emergency access box so that only the button 3 protrudes and is accessible to the user.

The emergency access device 5 makes it possible to actuate a lock actuator, which is an opening cable 4 in the present example, by pulling it, in the following two cases:

in the case of a particular event, such as an accident, an electric ejector automatically releases a pull rod 10 to allow a person to open the door from the outside during an emergency operation;

in the event of failure of the electrical system, a manual ejector of the pull rod 10 allows a user of the vehicle to open the vehicle by actuating the button 3.

Figure 2:
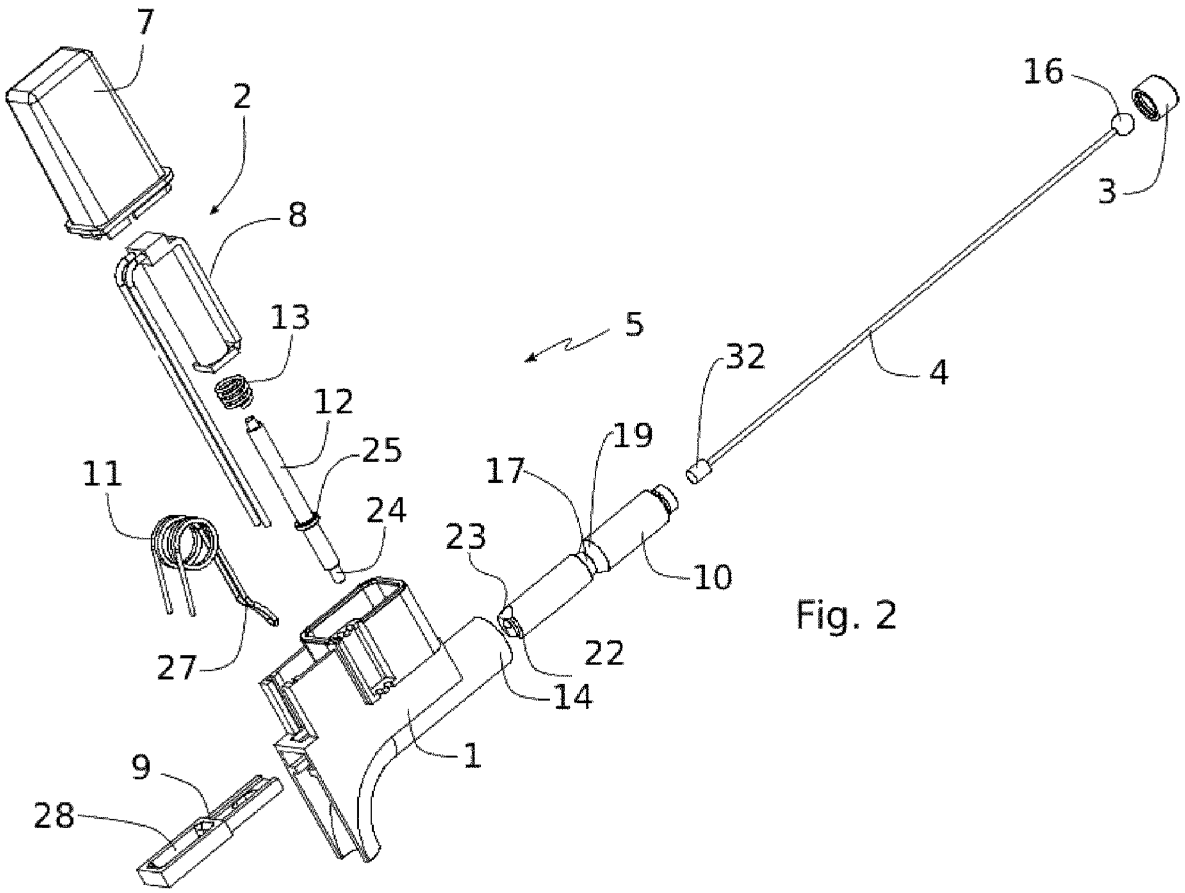
FIG. 2 is an exploded view of the device in FIG. 1.

The exploded view in FIG. 2 shows all the parts forming the emergency access device 5.

The electric ejector consists of the electric actuator 2, which in this case comprises an electromagnet 8 housed in a protective cover 7.

The mechanical ejector is made up of a slider 9 which is mounted inside the body 1.

The pull rod 10 is also housed inside the body 1 and is intended to be handled after it has been ejected from the body 1 following the action of the electric ejector or of the mechanical ejector. The pull rod 10 comprises the button 3 at one of its ends. The cable 4 is threaded into the pull rod 10.

A first spring 11 is designed to apply a load to the pull rod 10 in order for it to be ejected by either the electric ejector or the mechanical ejector.

The device 5 comprises a retention needle 12 for blocking the pull rod 10, this needle 12 being loaded by a second spring 13.

Figure 3:
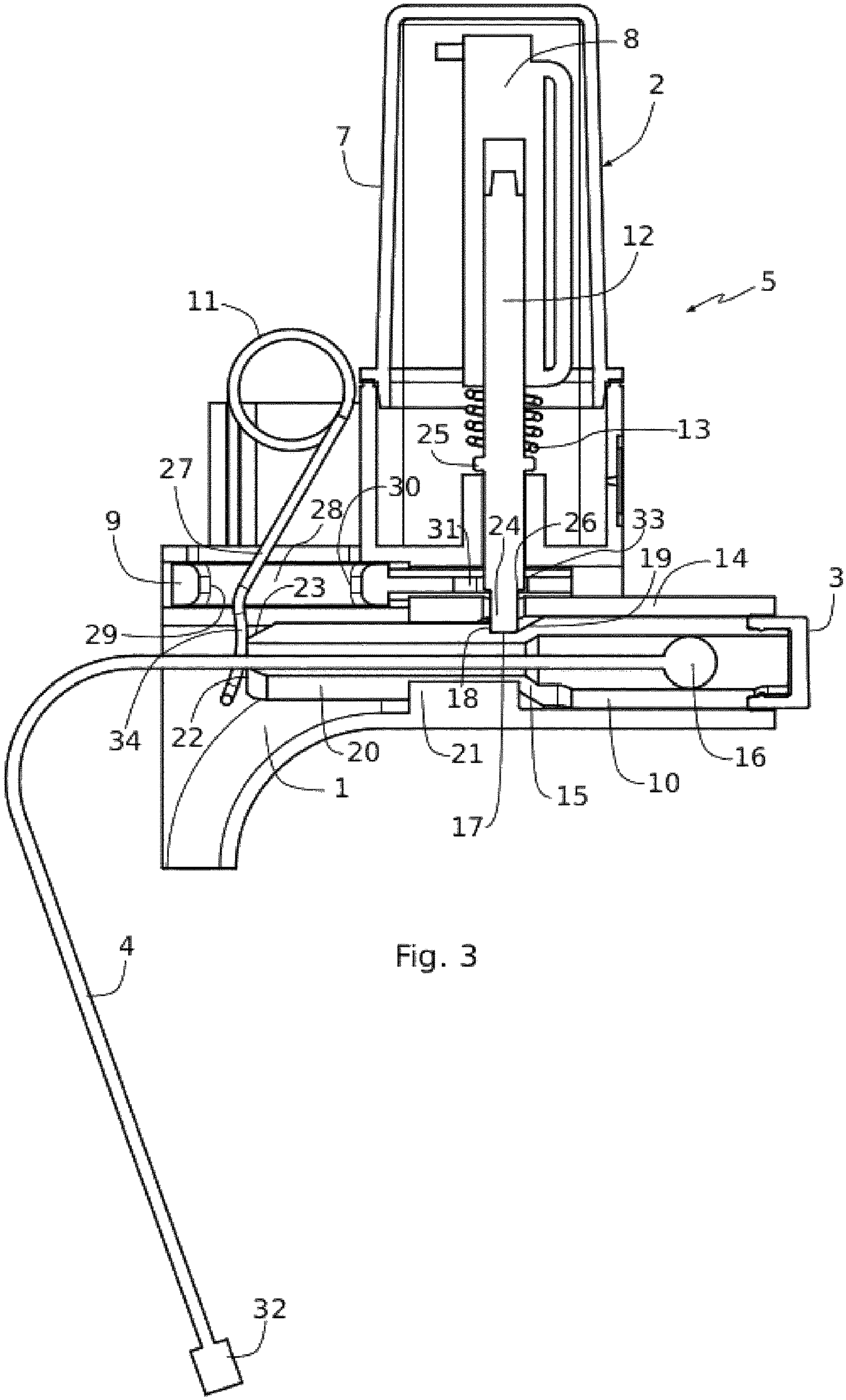
FIG. 3 is a view in longitudinal section of the device in FIG. 1.

FIG. 3 is a view in longitudinal section showing the arrangement of the parts that have just been described inside the body 1. In the position shown in FIG. 3, which corresponds to the position in FIG. 1, the device 5 is in the rest state and emergency access is not requested.

Figure 5:
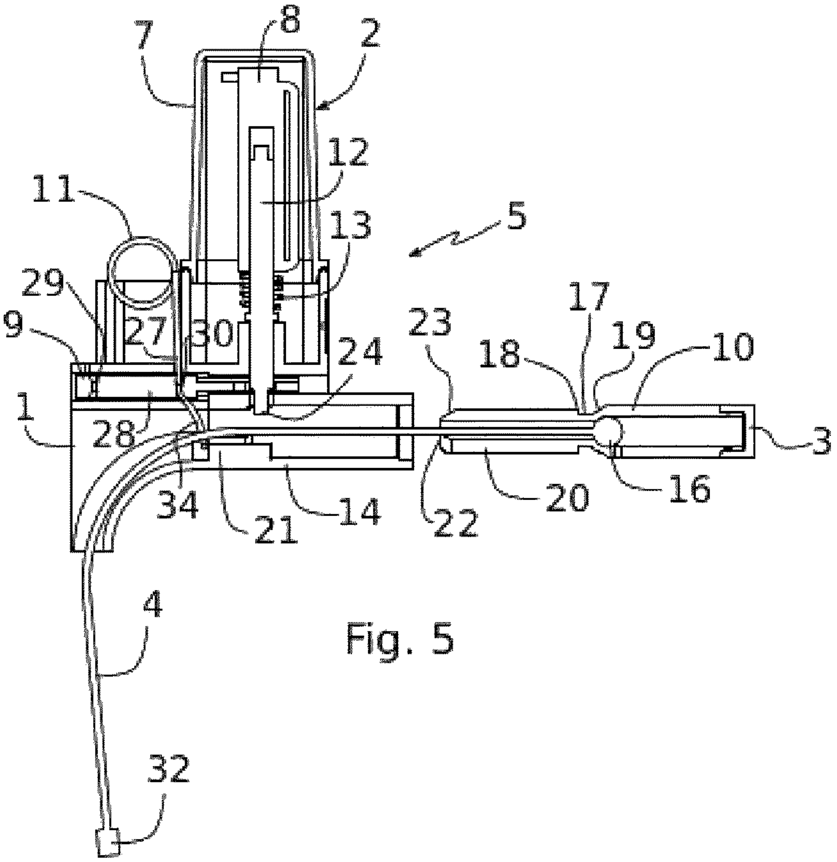
FIG. 5 illustrates the device from FIG. 1 in a first position during electrical ejection.
Figure 6:
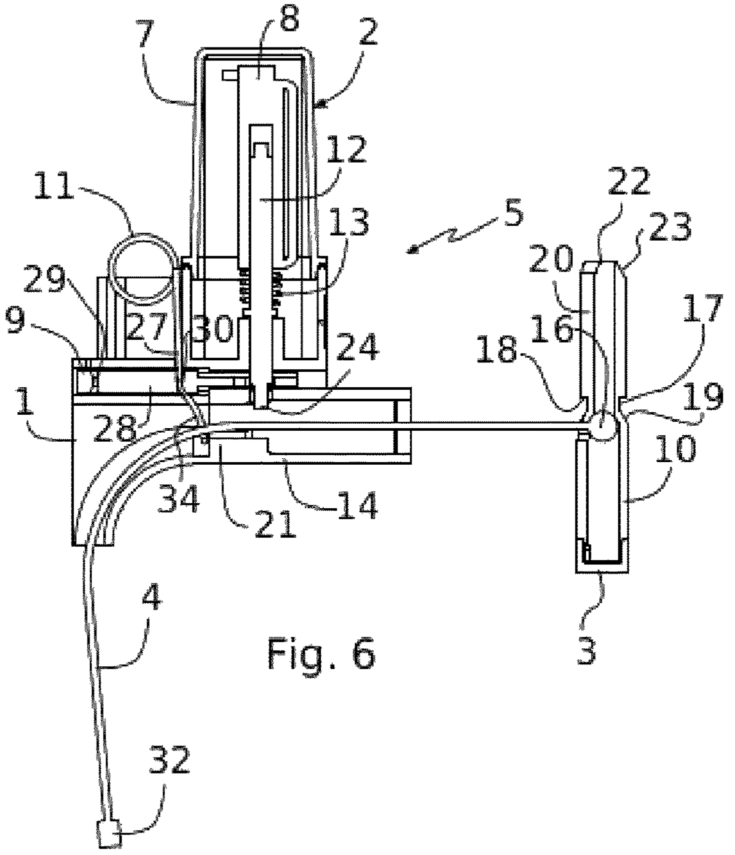
FIG. 6 illustrates the device from FIG. 1 in a second position during electrical ejection.

The pull rod 10 is mounted in a sheath 14 of the body 1 so as to slide between a retracted position (shown in FIG. 3) and a deployed position (shown, for example, in FIGS. 5 and 6). The pull rod 10 has a hollow body equipped with a shoulder 15 for blocking a first head 16 of the cable 4. The hollow body of the pull rod 10 is closed at its end by the button 3. The second head 32 of the cable 4 is intended to be connected to the lock of the vehicle (not shown) such that a pull exerted on the cable 4 causes the door of the vehicle to open.

On its outer surface, the pull rod 10 comprises a radial groove 17 formed by a clearance extending in a radial direction of the pull rod. The groove 17 is bounded on one side by an annular stopping surface 18, and on the other side by a conical surface 19.

The pull rod 10 further comprises a longitudinal slot 20 associated with a tongue 21 which is integral with the body 1 and makes it possible to maintain the angular orientation of the pull rod 10 in the sheath 14 while it slides therein. At the opposite end from the button 3, the pull rod 10 comprises a pressure end 22 equipped with a bevel 23.

The needle 12 is mounted so as to be able to move in translation on the body 1 along an axis perpendicular to the axis along which the sheath 14 extends. At one of its ends, the needle 12 comprises a stopping finger 24 designed to be housed in the groove 17 of the pull rod 10.

The needle 12 is also mounted so as to slide in the electromagnet 8 such that electrical activation of the electromagnet 8 causes the needle 12 to be lifted until the end of the needle 12 comes into abutment against the electromagnet 8. The needle 12 is thus movable between a position referred to as the position for releasing the pull rod, where the electromagnet 8 attracts the needle 12, and an opposite extreme position in which the needle 12 is in abutment on the body 1 by means of its flange 25. In the position illustrated in FIG. 3, the needle 12 is positioned slightly set back from the bearing position of its flange 25, the stopping finger 24 coming into abutment against the bottom of the groove 17 of the pull rod 10. This position is referred to as the position for blocking the pull rod 10. The pull rod 10 is specifically blocked in its retracted position by the stopping finger 24, which bears on the stopping surface 18.

The second spring 13 is disposed between the electromagnet 8 and the flange 25 so as to urge the needle 12 from its releasing position to its blocking position.

The needle 12 further comprises a stopping shoulder 26 close to the stopping finger 24.

The first spring 11 is mounted in the body 1 such that one of its tabs forms an ejection tab 27 which bears on the pressure end 22 of the pull rod 10 and which elastically urges the pull rod 10 toward its deployed position. In the rest position in FIG. 3, the loading of the pull rod 10 by the ejection tab 27 causes the stopping surface 18 to press against the stopping finger 24, and the pull rod 10 is thus locked in its retracted position.

The slider 9 is a part which is movable in translation in the body 1 in a direction parallel to the axis of the sheath 14. The slider 9 comprises a first portion equipped with a first slot 28. The ejection tab passes through the slot 28 and is freely movable in this slot 28 in a direction parallel to the axis of the sheath 14. This slot 28 is bounded by a lateral blocking surface 29 and by a lateral release surface 30 which are designed to cooperate with the ejection tab 27.

The slider 9 also comprises a second portion equipped with a second slot 31 surrounding the needle 12 and comprising a blocking rim 33.

Figure 4:
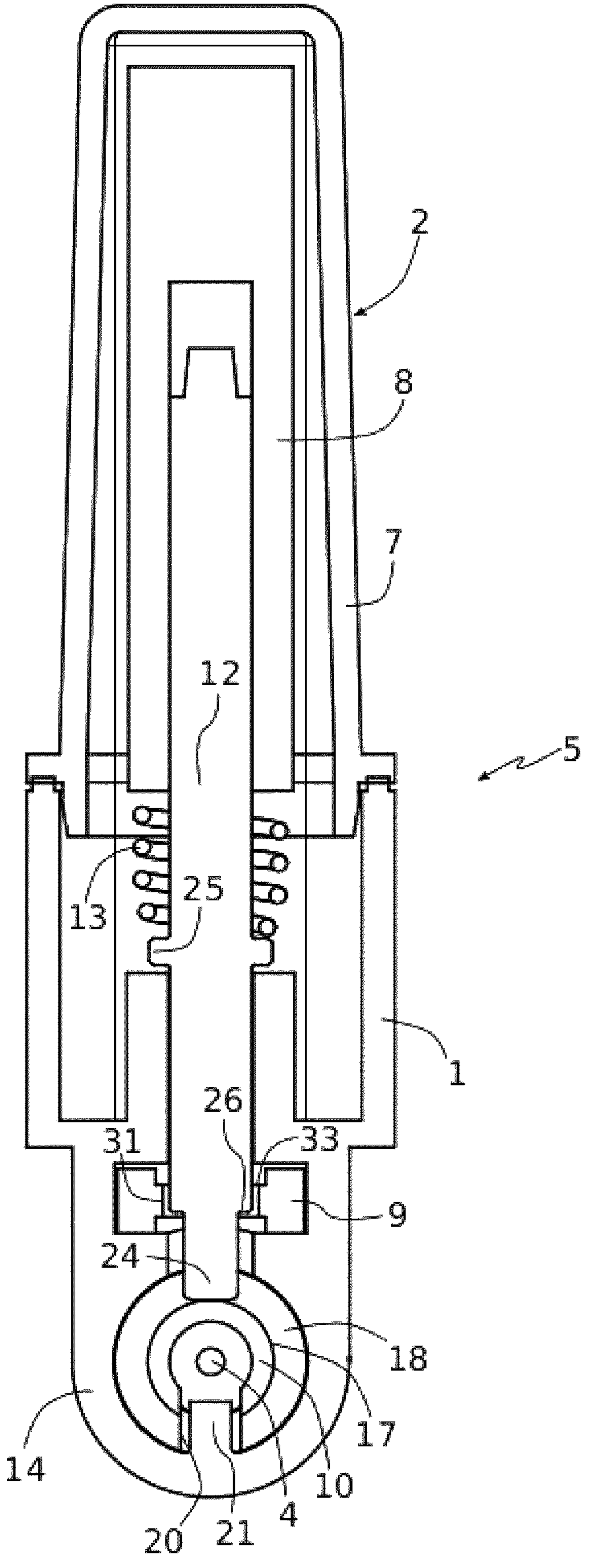
FIG. 4 is a view in cross section of the device in FIG. 1.

FIG. 4 is a view in cross section of the device 5 and details, in particular, the arrangement of the longitudinal slot 20 of the pull rod 10 and its cooperation with the tongue 21 of the body 1, and also the cooperation of the stopping finger 24 of the needle 12 against the bottom of the groove 17.

The first function of the device 5, that of implementing the electric ejector, will now be described with reference to FIGS. 5 and 6.

Starting from the rest position in FIG. 3, a control pulse is transmitted to the electromagnet. The electromagnet 8 is therefore first of all activated, and the needle 12 is magnetically attracted in the direction of the electromagnet 8 in a lifting movement causing the stop finger 24 to be withdrawn from the groove 17. Since the pull rod 10 is no longer retained by the stopping surface 18 pressing against the stopping finger 24, the ejection tab 27 of the spring 11 then urges the pull rod 10 to be ejected and the pull rod is ejected from the sheath 14. As soon as the electromagnet 8 ceases to be activated, the second spring 13 returns the needle 12 to its blocking position, but with the pull rod 10 already in its deployment position. This position, resulting from an activation pulse of the electromagnet 8, is the one shown in FIG. 5.

In accordance with FIG. 6, in its deployment position, the pull rod 10 then tilts about the first head 16 of the cable 4 such that the cable 4 runs through the longitudinal slot 20 of the pull rod 10, making it possible to position the pull rod 10 horizontally so as to make it easier to grip with two fingers and allow the user to pull on the cable 4.

The pull rod 10 is thus advantageously designed such that its end bearing the button 3 is heavier than its opposite end in order to cause this tilting to the position in FIG. 6.

The second function of the emergency access device 5 relating to implementing the mechanical ejector will now be described with reference to FIGS. 7 and 8.

Figure 7:
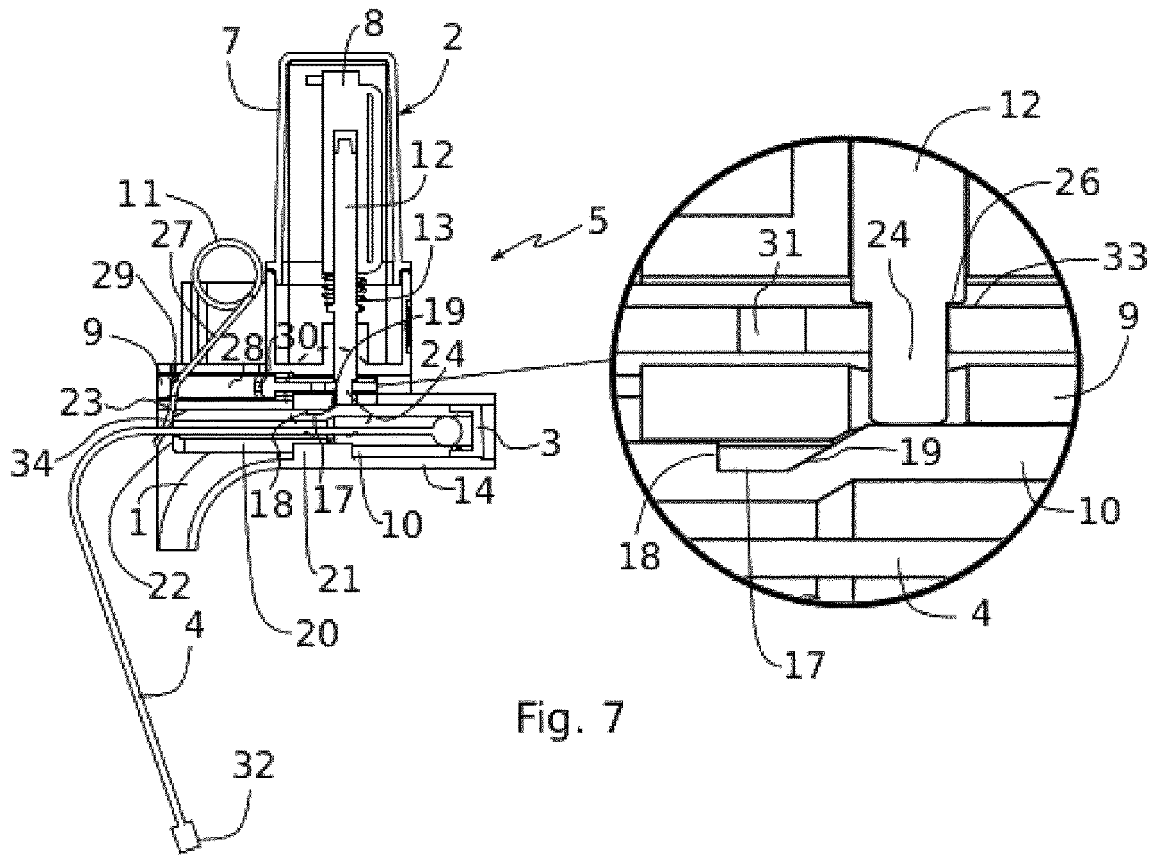
FIG. 7 illustrates the device from FIG. 1 in a first position during mechanical ejection.

When the user wishes to manually open the door of the vehicle without using the electrical means, he or she pushes the button 3 to the maximum into the sheath 14, as illustrated in FIG. 7. During this driving-in movement, the movement of the pull rod 10 in translation inside the sheath 14 causes the stopping finger 24 to rise along the oblique path formed by the conical surface 19 of the pull rod 10. By virtue of this conical surface 19, the needle 12 is thus pushed toward its position for releasing the pull rod 10 (position of the needle 12 illustrated in FIG. 7) by compressing the second spring 13.

The position illustrated in FIG. 7 is an unlocking position that occurs when the button 3 has been pushed to the maximum into the body 1. The stopping finger 24 of the needle 12 has been removed from the groove 17 and is positioned against the outer surface of the pull rod 10 (see magnified circle in FIG. 7).

During the movement of driving the pull rod 10 into the sheath 14, two operations are performed sequentially:

- the needle 12 first of all reaches its releasing position (the stopping finger 24 having reached the top of the conical surface 19); then
- the ejection tab 27 of the spring 11 comes into abutment against the lateral blocking surface 29 of the slider 9, and continuation of the movement causes the slider 9 to move in translation in the same direction of translation as the pull rod 10.

This final movement of the slider 9 in translation leads the blocking rim 33 of the slider 9 to be positioned under the stopping shoulder 26 of the needle 12 (this cooperation is visible in the magnified circle in FIG. 7).

In other words, when the user pushes the button 3 as far as its position in FIG. 7, the pull rod 10 lifts the needle 12 as far as its releasing position and the slider 9 is then moved in translation as far as its immobilizing position, in which the slider 9 immobilizes the needle 12 in its releasing position.

In the unlocking position in FIG. 7, the pull rod 10 is driven to the maximum into the body 1, the pressure end 22 urging the ejection tab 27 against the lateral blocking surface 29 of the slider 9.

Figure 8:
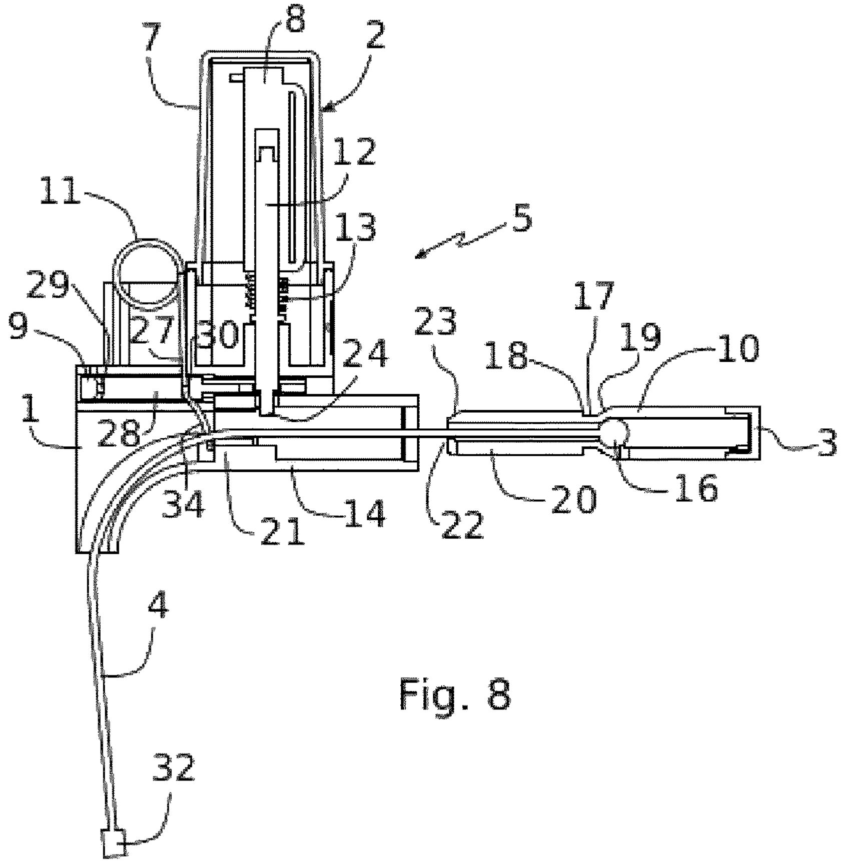
FIG. 8 illustrates the device from FIG. 1 in a second position during mechanical ejection.

Starting from the unlocking position in FIG. 7, when the user releases the pressure on the button 3, the pull rod 10 is then ejected by the ejection tab 27 since the stopping finger 24 can no longer interfere with the pull rod 10 (see FIG. 8).

At the end of the ejection movement, that is to say at the end of the travel of the ejection tab 27, which pushes the pull rod 10 out of the body 11, the ejection tab 27 additionally comes into abutment against the lateral release surface 30 of the slider 9 and then causes the slider 9 to move in translation back toward its position for releasing the needle 12. The needle 12 then returns to its initial blocking position (although the pull rod 10 is no longer inside the sheath 14) under the effect of the second spring 13, resulting in the position in FIG. 8.

From the position in FIG. 8, the pull rod 10 in its deployed position tilts to the horizontal position in the same way as in FIG. 6. The emergency access device 5 is thus ready to allow the user to pull on the pull rod 10 and open the door of the vehicle.

In the position in FIG. 8, the device 5 is in a locking position in which the pull rod 10 is in its deployed position, the ejection tab 27 being urged against the lateral release surface 30 of the slider 9 and the slider 9 being in its position for releasing the needle 12. This locking position of the device 5 corresponds to a position in which the device is ready to receive and lock the pull rod 10 in the body 1 again.

The ejection tab 27 comprises a curved portion 34 designed to come into abutment against the body 1 when the device 5 is in the position in FIG. 8.

After the emergency access device has been triggered by virtue of the electric ejector and by virtue of the mechanical ejector, the pull rod 10 can be put back into the body 1 by reintroducing this pull rod 10 into the sheath 14 and moving it in translation toward the inside of the body 1 such that the longitudinal slot 20 cooperates with the tongue 21. The bevel 23 on the pressure end 22 forms an oblique path which then pushes the stopping finger 24 of the needle 12 upward. After this lifting movement, the stopping finger 24 then slides over the outer surface of the pull rod 10 until it is inserted into the groove 17 under the effect of the second spring 13. The device 5 is then in its rest position in FIG. 3.

The spring 11 and its ejection tab 27 thus perform four functions:

- in the rest position of the device 5, the ejection tab 27 urges the stopping surface 18 of the pull rod 10 against the stopping finger 24 of the needle 12. The rest position in FIG. 3 is thus a stable position. This position is occupied by the device 5 throughout normal operation of the vehicle, that is to say apart from when the emergency device 5 is triggered;
- the ejection tab 27 makes it possible to transmit the driving-in movement of the button 3 (see FIG. 7) to the slider 9. The movement of the pull rod 10 in translation is transformed into a movement of the slider 9 in translation so as to make the latter move into its immobilizing position (see FIG. 7);
- the ejection tab 27 ejects the pull rod 10 from the body 1 as soon as the needle 12 is in its releasing position and does not retain the pull rod 10 in its retracted position;
- the ejection tab 27 causes the slider 9 to move in translation back to its releasing position when the ejection tab 27 reaches the end of the ejection travel (see FIG. 8).

Variant embodiments of the emergency access device may be implemented without departing from the scope of the invention. For example, the pull rod 10 may have a square or rectangular cross section, meaning that the tongue 21 and the slot 20 are then not required.

Moreover, the electric ejector may comprise any other alternative means for electrically controlling the movement of the needle 12, for example an electric motor and a suitable gear set.

The invention claimed is:

1. An emergency access device for a vehicle opening leaf, the emergency access device comprising:
- a body;
- a graspable pull rod that is connected to a lock actuator and is movable between: a retracted position in which the pull rod is retracted into the body and a deployed position in which the pull rod protrudes from the body, the graspable pull rod comprising a slanted surface slanting toward a radial groove of the graspable pull rod;
- an elastic member that urges the pull rod toward the deployed position of the pull rod;
- a retention needle that is movable transversely to the pull rod between a blocking position for blocking the pull rod in the retracted position of the pull rod and a releasing position for releasing the pull rod, the retention needle including a stopping finger;
- an electric ejector configured to release the pull rod from the retracted position, the electric ejector comprising an electric actuator configured to move the retention needle from the blocking position of the retention needle to the releasing position of the retention needle; and
- a mechanical ejector configured to release the pull rod from the retracted position, the mechanical ejector comprising a slider that is movable between: an immobilizing position for immobilizing the retention needle in the releasing position and a releasing position for releasing the retention needle,
- wherein the pull rod comprises a conical surface forming an oblique path configured to cause the retention needle to move from the blocking position to the releasing position during a movement of the pull rod in translation in the body by movement of the stopping finger rising along the oblique path formed by the conical surface.

2. The device as claimed in claim 1, wherein the slider comprises a first slot, and
- wherein the elastic member comprises an ejection tab configured to apply a load to a pressure end of the pull rod, the ejection tab passing through the first slot of the slider.

3. The device as claimed in claim 2, wherein the first slot of the slider comprises a lateral blocking surface, the ejection tab being configured to apply a load to the lateral blocking surface and to cause the slider to move in translation from the releasing position of the slider toward the immobilizing position of the slider, the device having an unlocking position in which the pull rod is driven to the maximum into the body, the pressure end of the pull rod urging the ejection tab against the lateral blocking surface of the slider and the slider being in the immobilizing position retaining the retention needle in the releasing position.

4. The device as claimed in claim 3, wherein the first slot of the slider comprises a lateral release surface, the ejection tab being configured to apply a load to the lateral release surface and to cause the slider to move in translation from the immobilizing position of the slider toward the releasing position of the slider, the device having a locking position in which the pull rod is in the deployed position, the ejection tab being urged against the lateral release surface of the slider and the slider being in the releasing position for releasing the retention needle.

5. The device as claimed in claim 3, wherein the retention needle comprises a stopping shoulder and the slider comprises a second slot having a blocking rim, the retention needle passing through the second slot and the stopping shoulder being in abutment against the blocking rim when the slider is in the immobilizing position of the slider.

6. The device as claimed in claim 2, wherein the first slot of the slider comprises a lateral release surface, the ejection tab being configured to apply a load to the lateral release surface and to cause the slider to move in translation from the immobilizing position of the slider toward the releasing position of the slider, the device having a locking position in which the pull rod is in the deployed position, the ejection tab being urged against the lateral release surface of the slider and the slider being in the releasing position for releasing the retention needle.

7. The device as claimed in claim 6, wherein the ejection tab comprises a curved end forming a stop of the elastic element against the body when the device is in the locking position.

8. The device as claimed in claim 7, wherein the retention needle comprises a stopping shoulder and the slider comprises a second slot having a blocking rim, the retention needle passing through the second slot and the stopping shoulder being in abutment against the blocking rim when the slider is in the immobilizing position of the slider.

9. The device as claimed in claim 6, wherein the retention needle comprises a stopping shoulder and the slider comprises a second slot having a blocking rim, the retention needle passing through the second slot and the stopping shoulder being in abutment against the blocking rim when the slider is in the immobilizing position of the slider.

10. The device as claimed in claim 2, wherein the retention needle comprises a stopping shoulder and the slider comprises a second slot having a blocking rim, the retention needle passing through the second slot and the stopping shoulder being in abutment against the blocking rim when the slider is in the immobilizing position of the slider.

11. An emergency access device for a vehicle opening leaf, the emergency access device comprising:
- a body;
- a graspable pull rod that is connected to a lock actuator and is movable between: a retracted position in which the pull rod is retracted into the body and a deployed position in which the pull rod protrudes from the body;
- an elastic member that urges the pull rod toward the deployed position of the pull rod;
- a retention needle that is movable transversely to the pull rod between a blocking position for blocking the pull rod in the retracted position of the pull rod and a releasing position for releasing the pull rod;
- an electric ejector configured to release the pull rod from the retracted position, the electric ejector comprising an electric actuator configured to move the retention needle from the blocking position of the retention needle to the releasing position of the retention needle; and
- a mechanical ejector configured to release the pull rod from the retracted position, the mechanical ejector comprising a slider that is movable between: an immobilizing position for immobilizing the retention needle in the releasing position and a releasing position for releasing the retention needle,
- wherein the pull rod comprises an oblique path configured to cause the retention needle to move from the blocking position to the releasing position during a movement of the pull rod in translation in the body,
- wherein the pull rod comprises a hollow body and a longitudinal slot, and the lock actuator comprises a cable that is threaded into the hollow body, and
- wherein the pull rod is configured, in the deployed position, to pivot with respect to the cable so that the cable protrudes from the longitudinal slot.

12. The device as claimed in claim 11, wherein the hollow body comprises a tongue configured to be inserted into the longitudinal slot when the pull rod is in the retracted position.

13. The device as claimed in claim 12, wherein the pull rod comprises a radial groove bounded by:
- an annular stopping surface configured to cooperate with a stopping finger situated at one end of the retention needle in order to keep the pull rod in the retracted position, and
- a conical surface forming said oblique path.

14. The device as claimed in claim 12, wherein the slider comprises a first slot, and
- wherein the elastic member comprises an ejection tab configured to apply a load to a pressure end of the pull rod, the ejection tab passing through the first slot of the slider.

15. The device as claimed in claim 11, wherein the pull rod comprises a radial groove bounded by:
- an annular stopping surface configured to cooperate with a stopping finger situated at one end of the retention needle in order to keep the pull rod in the retracted position, and
- a conical surface forming said oblique path.

16. The device as claimed in claim 11, wherein the slider comprises a first slot, and
- wherein the elastic member comprises an ejection tab configured to apply a load to a pressure end of the pull rod, the ejection tab passing through the first slot of the slider.

17. An emergency access device for a vehicle opening leaf, the emergency access device comprising:
- a body;
- a graspable pull rod that is connected to a lock actuator and is movable between: a retracted position in which the pull rod is retracted into the body and a deployed position in which the pull rod protrudes from the body;
- an elastic member that urges the pull rod toward the deployed position of the pull rod;
- a retention needle that is movable transversely to the pull rod between a blocking position for blocking the pull rod in the retracted position of the pull rod and a releasing position for releasing the pull rod;
- an electric ejector configured to release the pull rod from the retracted position, the electric ejector comprising an electric actuator configured to move the retention needle from the blocking position of the retention needle to the releasing position of the retention needle; and
- a mechanical ejector configured to release the pull rod from the retracted position, the mechanical ejector comprising a slider that is movable between: an immobilizing position for immobilizing the retention needle in the releasing position and a releasing position for releasing the retention needle,
- wherein the pull rod comprises an oblique path configured to cause the retention needle to move from the blocking position to the releasing position during a movement of the pull rod in translation in the body,
- wherein the pull rod comprises a radial groove bounded by:
  - an annular stopping surface configured to cooperate with a stopping finger situated at one end of the retention needle in order to keep the pull rod in the retracted position, and
  - a conical surface forming said oblique path.

18. The device as claimed in claim 17, wherein the pull rod has a pressure end comprising a bevel that forms an oblique path configured to push the retention needle from the blocking position toward the releasing position when the pull rod is inserted into the body.

19. The device as claimed in claim 18, wherein the slider comprises a first slot, and
- wherein the elastic member comprises an ejection tab configured to apply a load to a pressure end of the pull rod, the ejection tab passing through the first slot of the slider.

20. The device as claimed in claim 17, wherein the slider comprises a first slot, and wherein the elastic member comprises an ejection tab configured to apply a load to a pressure end of the pull rod, the ejection tab passing through the first slot of the slider.

* * * * *